United States Patent [19]

Mastrolia

[11] Patent Number: 5,472,155
[45] Date of Patent: Dec. 5, 1995

[54] WOVEN CONNECTION FOR RISERS AND SUSPENSION LINES OF A PARACHUTE

[75] Inventor: Bradley Mastrolia, Buena Park, Calif.

[73] Assignee: McDonnell Douglas Corporation, Huntington Beach, Calif.

[21] Appl. No.: 202,326

[22] Filed: Feb. 28, 1994

[51] Int. Cl.⁶ .......................... B64D 17/24; B64D 17/26
[52] U.S. Cl. ................. 244/151 A; 244/145; 244/151 R; 57/23; 87/8
[58] Field of Search .............................. 244/145, 151 A, 244/142, 143, 151 R, 127; 57/202, 22, 23, 8; 87/8, 13; 441/69; 114/253

[56] References Cited

U.S. PATENT DOCUMENTS

| | | | |
|---|---|---|---|
| 1,366,843 | 1/1921 | Smith | 244/145 |
| 1,649,934 | 10/1927 | Thörnblad et al. | 244/142 |
| 2,112,061 | 3/1938 | Avorio | 244/145 |
| 2,352,871 | 7/1944 | Vernon | 244/142 |
| 2,419,829 | 4/1947 | Fraim | 244/145 |
| 2,526,264 | 10/1950 | Neff | 66/193 |
| 3,602,462 | 8/1971 | Slater et al. | 244/145 |
| 4,043,290 | 8/1977 | Holland | 441/69 |
| 4,684,082 | 8/1987 | Gargano | 244/142 |
| 4,895,538 | 1/1990 | Marks | 441/69 |
| 4,974,488 | 12/1990 | Spralja | 57/23 |
| 5,062,344 | 11/1991 | Gerker | 87/13 |

FOREIGN PATENT DOCUMENTS

| | | | |
|---|---|---|---|
| 430023 | 10/1911 | France | 87/8 |
| 1018230 | 12/1952 | France | |
| 853264 | 10/1952 | Germany | |
| 853857 | 10/1952 | Germany | |
| 2757524 | 6/1979 | Germany | 57/23 |
| 2914349 | 10/1980 | Germany | 87/8 |
| 2945708 | 5/1981 | Germany | 87/8 |

OTHER PUBLICATIONS

Dan Poynter, *The Parachute Manual*, 1984, pp. 400, 401, 403, 487.

Primary Examiner—William Grant
Attorney, Agent, or Firm—Donald E. Stout; John P. Scholl; Roger C. Turner

[57] ABSTRACT

Each of two risers is composed of a number of braided cords that are woven together. Each cord of one of the risers has a slit located where the two risers converge. Each slit provides communication with a concentric cavity in that cord. Each opposing cord for the other riser is inserted through the slit and has a section which lies in the cavity. When tension is applied, the braided cord enclosing the cavity radially constricts and the friction of the cavity walls holds the enclosed cord section in the cavity. The cords enclosing cavities continue on to become suspension lines connected to the parachute canopy. In one embodiment, each cord lying inside another terminates inside the cavity. Alternatively, the cord lying inside the cavity exits the cavity through a second slit and continues on to become another extension line. To connect the risers to an article to be decelerated by the parachute, the cords for both risers have slits near their ends. Each slit communicates with a concentric cavity. The length of each cord lying beyond the slit doubles back and is inserted through its own slit to lie inside its cavity. A loop is thus formed at the end of the riser for attachment to the article. When tension is applied to the riser, the cord section containing the cavity radially constricts and presses against the enclosed cord section to prevent it from being pulled out of the cavity.

9 Claims, 3 Drawing Sheets

WOVEN CONNECTION FOR RISERS AND SUSPENSION LINES OF A PARACHUTE

BACKGROUND OF THE INVENTION

1. Field of the Invention

The present invention relates to mechanical connectors and, more particularly, to a mechanism for connecting the risers to the suspension lines of a parachute, and for connecting the risers to an article to be decelerated by the parachute.

2. Description of the Prior Art

When an article is to be dropped to the ground from an aircraft or otherwise decelerated, a parachute is used to increase the article's drag. The parachute is composed of a canopy, risers, and suspension lines. The canopy comprises the primary means for increasing drag. Suspension lines connect the canopy to risers, and the risers attach the parachute to the article being dropped or decelerated.

A plurality of risers are used to attach the article to the parachute at a number of distinct points in order to simplify the connecting gear and minimize its weight. The former consideration facilitates the release of the article from the parachute and thereby reduces the time required to release it. A quick release reduces the potential for the article to be damaged by being dragged across the ground or to become entangled by risers and suspension lines when the article is dropped into a body of water. The use of a plurality of risers further stabilizes the article during its deceleration or drop by reducing the rotation of the article about an axis perpendicular to its velocity vector.

A multiplicity of suspension lines are used to maximize the deployment, efficiency, and stability of the deployed canopy. There are always more suspension lines than risers. Parachutes have a confluence area where the risers and suspension lines converge and are connected to each other.

Having a singular confluence area is preferable to having each riser connected to several suspension lines because the former arrangement reduces the probability of entanglement upon deployment of the canopy. A confluence area also allows the canopy to maintain a consistent shape when the attached article rotates and unloads one of the risers.

The parachutes of the prior art use risers having loops at their ends formed by each riser doubling back on itself. A confluence area is obtained by weaving or otherwise binding the risers together adjacent the loops, and connecting the suspension lines to the loops. The foregoing is illustrated in prior art FIG. 1, wherein parachute 11 of the prior art is comprised of canopy 13, suspension lines 15, and risers 17 and 19. Article 21 is attached to risers 17 and 19.

Prior art FIG. 2 is an enlarged drawing of confluence area 23 of parachute 11 where risers 17 and 19 converge and are connected to suspension lines 15. Risers 17 and 19 double back on themselves to form loops 25 and 27. The double thicknesses of risers 17 and 19 are woven together. Suspension lines 15 have eyelets 29 attached to their ends. Loops 25 and 27 run through eyelets 29 to connect risers 17 and 19 to suspension lines 15.

Designers of parachutes have long sought to reduce the bulk and complexity of the connection between the risers and suspension lines because such a reduction reduces the probability of a snag during the unfolding and deployment of a packed parachute, and thus increases its reliability. Furthermore, a reduction in bulk would reduce the weight of the parachute and also allow it to be packed into a smaller volume, thus facilitating its handling and storage.

SUMMARY OF THE PRESENT INVENTION

Briefly, the present invention is a connector for connecting the suspension lines to the two risers of a parachute. The connector of the invention is also for connecting the risers to the article to be decelerated by the parachute. With respect to the former application, each riser is composed of a number of braided cords that are woven together. Each cord of one of the risers has a slit located where the two risers converge. Each slit provides communication with a concentric cavity in that cord. Each opposing cord for the other riser passes through the slit and has a section which lies in the cavity.

Initially, the cord section lying inside the cavity is weakly attached to the cavity by tacking. When tension is applied, the braided cord enclosing the section of the other cord radially constricts, and the friction of the cavity walls holds the enclosed cord section in the cavity.

In one embodiment, each cord lying Inside another terminates inside the cavity. The cords having cavities continue on to become suspension lines connected to the parachute. Each pair of converging riser cords thus becomes one suspension line.

Alternatively, each cord lying inside another exits the cavity through a second slit, and continues on to become an extension line connected to the parachute canopy. As the cords having cavities also continue on to become suspension lines, each pair of converging riser cords becomes two suspension lines. These two designs can both be used in the same parachute to vary the number of suspension lines between the number of riser cords and one-half the number of riser cords.

With regard to using the invention to connect the riser to the article to be decelerated by the parachute, the cords for both risers have slits near their ends. Each slit communicates with a concentric cavity located near the end of the cord. The length of each cord beyond the slit doubles back and passes through its own slit to lie inside its cavity. A loop is thus formed at the end of the riser for attachment to the article. When tension is applied to the riser, the cord section containing the cavity radially constricts and presses against the enclosed length to prevent it from being pulled out of the cavity.

The invented connector has less bulk and complexity than the parachute connectors of the prior art, and thereby provides improved reliability for the complete deployment of the canopy. A further advantage is that of lower weight and storage volume. In addition, the invented connection Is shorter in length than the connections of the prior art. This allows for longer risers and suspension lines which, in turn, provide improved stability for the parachute.

EMBODIMENTS OF THE PRESENT INVENTION

Figure 1:
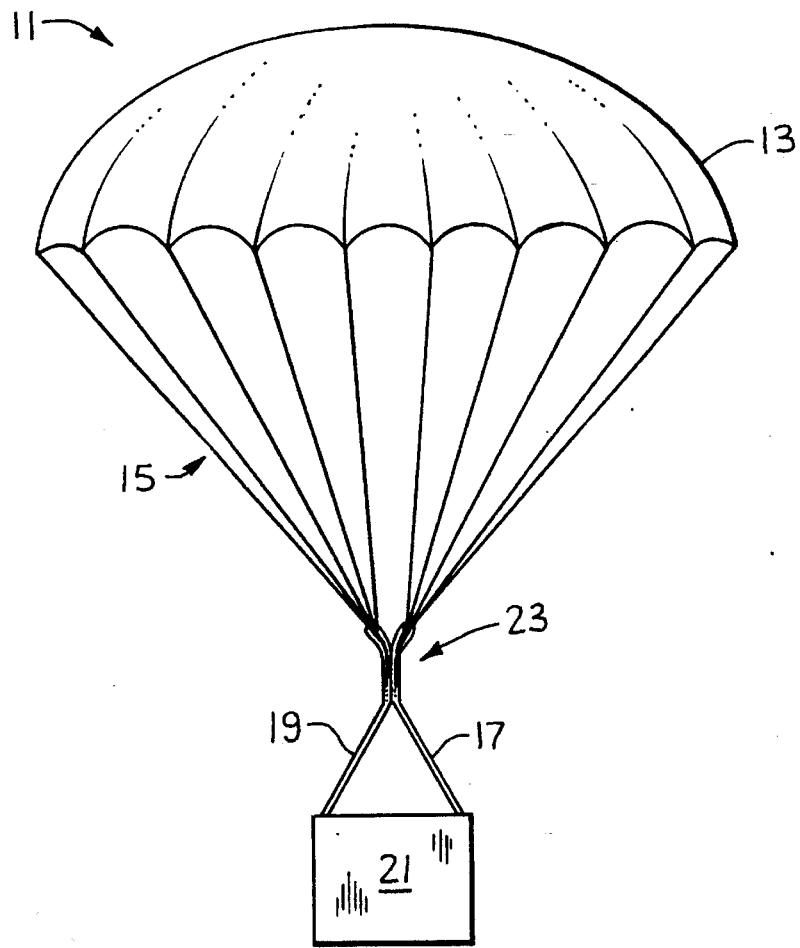
FIG. 1 shows a parachute using a connector of the prior art to connect the risers to the suspension lines.
Figure 2:
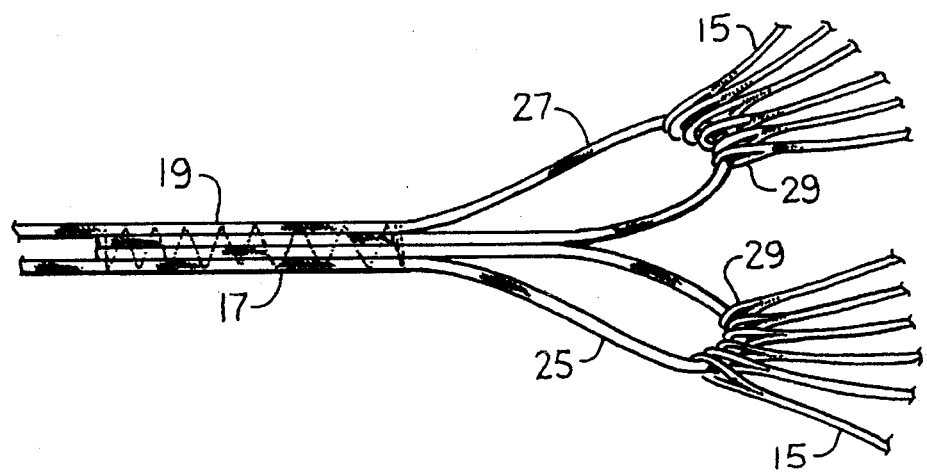
FIG. 2 is an enlargement of a portion of FIG. 1, particularly illustrating the prior art means for connecting the risers and suspension lines of a parachute.
Figure 3:
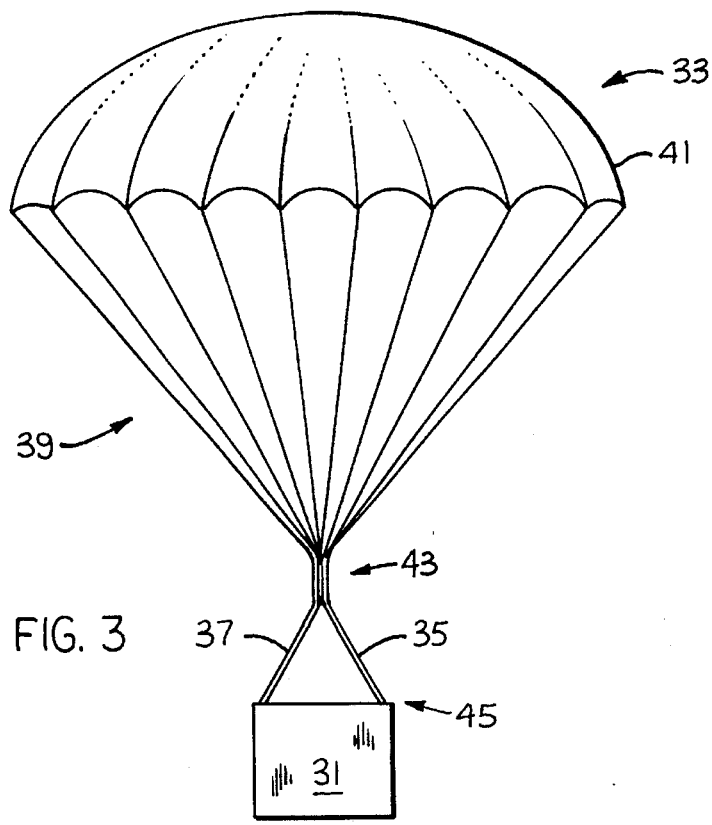
FIG. 3 shows a parachute using the connectors of the present invention to connect the suspension lines to the risers and also to connect an article to the risers.

Turning to FIG. 3, article 31 is shown being dropped to the ground with the aid of deployed parachute 33. Parachute 33 is comprised of risers 35 and 37, suspension lines 39, and canopy 41. Area 43 denotes the area of confluence where risers 35 and 37 are connected to suspension lines 39 by means of a connector of the present invention. Area 45 denotes where riser 35 is attached to article 31 by means of another embodiment of the present invention.

Figure 4:
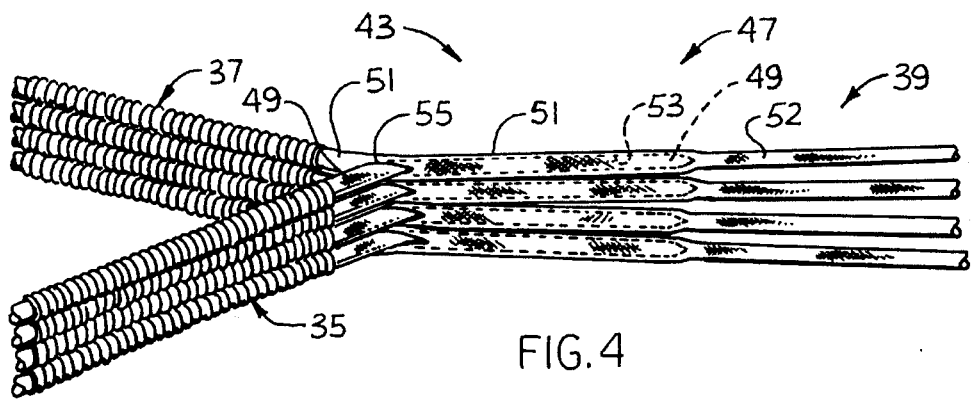
FIG. 4 is an enlargement of a portion of FIG. 3, particularly showing a connector of the present invention connecting the risers to the suspension lines of the parachute.

FIG. 4 is an enlargement of confluence area 43 and illustrates connector 47, an embodiment of the present invention. Riser 35 is composed of a plurality of cords that are woven together, as is riser 37. The weaving for both risers stops just before the risers converge. Riser 35 includes cord 49 and riser 37 includes cord 51. Cords 49 and 51 oppose and meet each other where risers 35 and 37 converge. Suspension line 52 is one of suspension lines 39.

Figure 5:
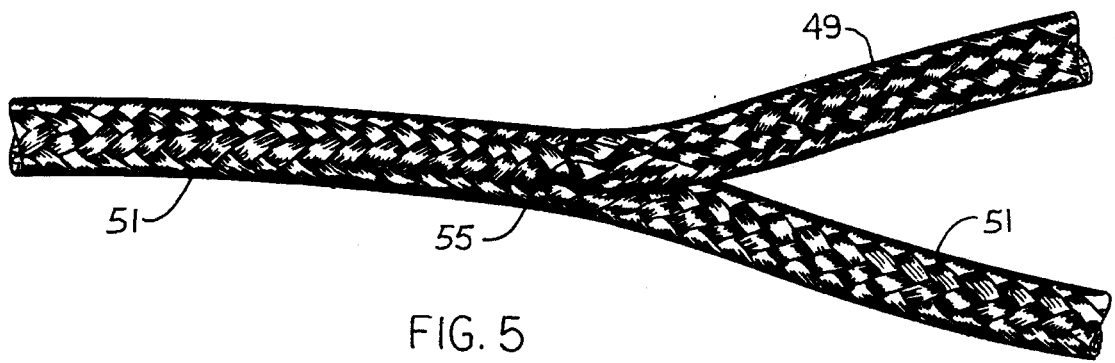
FIG. 5 shows the convergence of two braided cords in a connector of the present invention.

As detailed in FIG. 5, cords 49 and 51 are composed of braided yarns. Cord 51 contains concentric cavity 53. Slit 55 is located in the side of cord 51 and provides communication with cavity 53. Cord 49 passes through slit 55 and into cavity 53. A length of cord 49 thus lies within cavity 53. Cord 51, no longer bound to the other cords comprising riser 37, continues on to become suspension line 52. It can thus be seen that there is a suspension line for every pair of riser cords.

When tensile force is applied to cord 51, for example, when canopy 41 opens and article 31 is decelerated, the braids comprising the walls of cavity 53 constrict radially towards the longitudinal axis of cord 51 and cavity 53. This constriction applies a normal force against the section of cord 49 lying in cavity 53. The resultant friction prevents cord 49 from being pulled out of cavity 53, and thus secures the attachment between cords 49 and 51, and thus between cord 49 and suspension line 52.

Upon being inserted into cavity 53, cord 49 is initially attached thereto by tacking (not shown). The tacking keeps cord 49 from slipping out of cavity 53 before cord 51 has begun to constrict.

The remaining cords of riser 35 are identical to cord 49, and the remaining cords of riser 37 are identical to cord 51. Moreover, the relationship between the other opposing cords for risers 35 and 37 are the same as the relationship between opposing cords 49 and 51.

Figure 6:
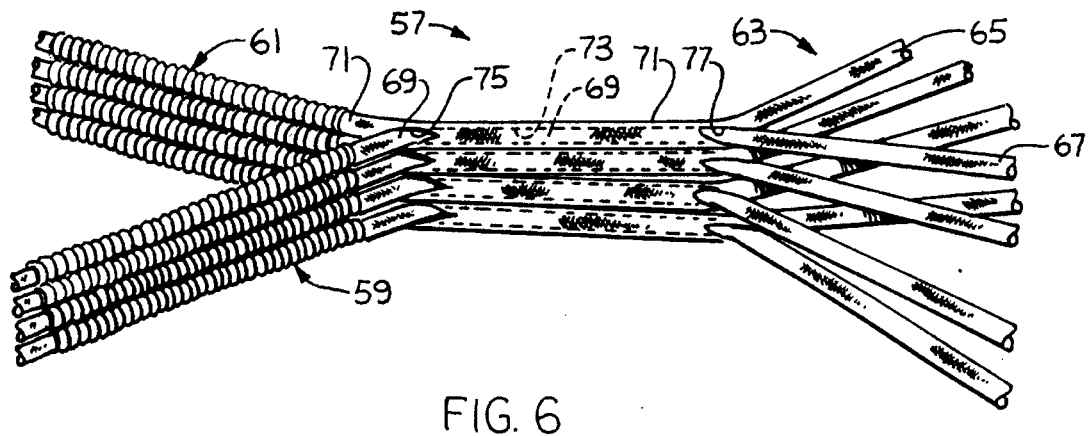
FIG. 6 illustrates another embodiment of the connector of the present invention connecting the risers to the suspension lines of a parachute.

FIG. 6 shows connector 57, another embodiment of the present invention. Connector 57 is connecting risers 59 and 61 to suspension lines 63 of a parachute. Suspension lines 63 include suspension lines 65 and 67. Riser 59 is composed of a plurality of cords that are woven together, as is riser 61. The weaving for both risers stops Just before their confluence.

Riser 59 includes cord 69, and riser 61 includes cord 71. The cords are composed of braided yarns. Cords 69 and 71 oppose and meet each other where risers 59 and 61 converge. Cord 71 contains concentric cavity 73. Slits 75 and 77 are located in the side of cord 71 and provide communication with cavity 73.

Cord 69 is inserted through slit 75 and into cavity 73, and passes out of cavity 73 by means of slit 77. A length of cord 69 thus lies within cavity 73. Cord 71, no longer bound to the other cords of riser 61, continues on to become suspension line 65. After exiting cavity 73 through slit 77, cord 69 continues on to become suspension line 67. It can thus be seen that there is a suspension line for each riser cord.

When tensile force is applied to cord 69, for example, when the parachute canopy opens and an article attached to the other end of risers 59 and 61 is decelerated, the braids comprising the walls of cavity 73 constrict radially towards the longitudinal axis of cord 71 and cavity 73. This constriction applies a normal force against the section of cord 69 lying in cavity 73. The resultant friction prevents cord 69 from slipping in cavity 73, and thus secures the attachment between cords 69 and 71, and thus between the foregoing cords and suspension lines 65 and 67.

Upon being inserted into cavity 73, cord 69 is initially attached thereto by tacking (not shown). The tacking keeps cord 69 from slipping before cord 71 has begun to constrict.

The remaining cords of riser 59 are identical to cord 69, and the remaining cords of riser 61 are identical to cord 71. Moreover, the relationship between the other opposing cords for risers 59 and 61 are the same as the relationship between opposing cords 69 and 71.

For connector 57, the number of suspension lines for two risers will be equal to the number of converging riser cords. For connector 47, the number of suspension lines for two risers will be one-half the number of converging riser cords. The number of suspension lines may be varied between these two limits by constructing a connector that intersperses the cord connections used in the two foregoing embodiments.

Figure 7:
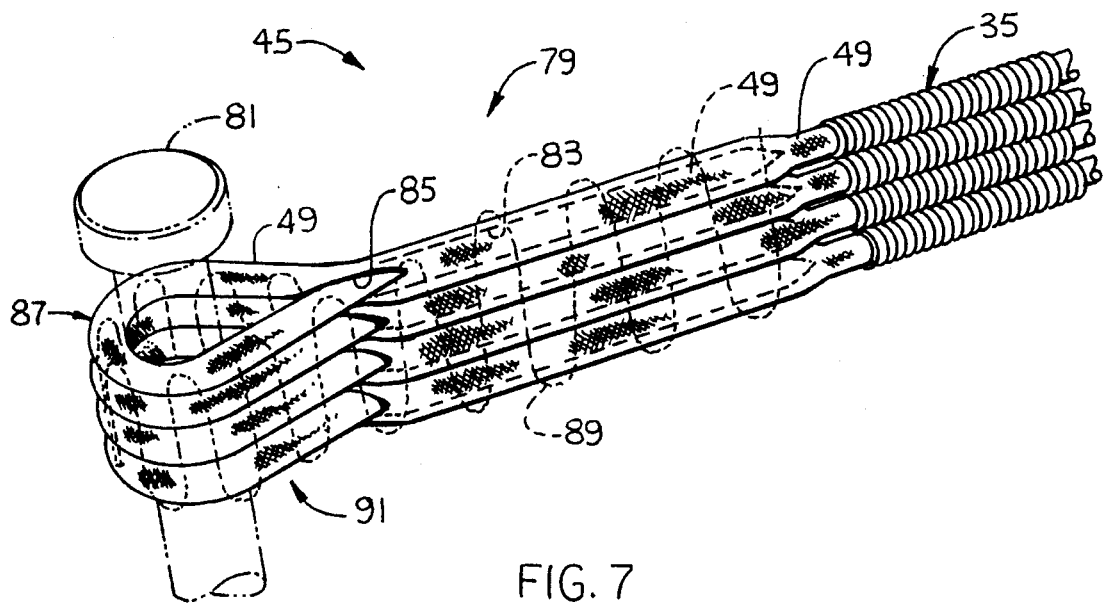
FIG. 7 shows an embodiment of the connector of the present invention connecting an article to the risers of a parachute.

FIG. 7 is an enlargement of area 45 of FIG. 3, and shows connector 79, another embodiment of the present invention, being used to attach riser 35 of parachute 33 to pin 81 (shown in phantom) of article 31. As previously noted, riser 35 is composed of braided cords that are woven together, and includes cord 49. The weaving stops Just before riser 35 reaches pin 81.

Cord 49 contains concentric cavity 83. Slit 85 is located in the side of cord 49 and communicates with cavity 83. Cord 49 doubles back on itself to form loop 87. The end of cord 49 then passes through slit 85 and into cavity 83 so that a length of cord 49 lies within cavity 83.

When tensile force is applied to cord 49, the walls of cavity 83 constrict radially towards the longitudinal axis of cord 49 and cavity 83. This constriction prevents the end of cord 49 from being pulled out of cavity 83, and thus maintains the integrity of loop 87. Upon being inserted into cavity 83, cord 49 is initially attached thereto by tacking (not shown). The tacking keeps cord 49 from slipping in cavity 83 before cavity 83 has begun to constrict.

The other cords composing riser 49 are identically constructed. Stitching 89 holds the cords composing riser 49 together, where the cords are not woven together and, in particular, maintains the alignment of loop 87 and the other loops to form eye 91. Riser 35 is attached to article 31 by inserting pin 81 in eye 91.

While several exemplary embodiments of the present invention have been shown and described, such embodiments are merely illustrative and do not restrict the breadth of the invention. Moreover, changes modifications and substitutions to the embodiments shown and described may be made by persons having ordinary skill in the art without departing from the spirit and scope of the invention. The scope of the invention is limited only by the following claims.

What is claimed is:

1. A parachute comprising:

a canopy;

a first cord including a first riser, a confluence section, and a first suspension line, said suspension line having a first end attached to said canopy, and said confluence section being situated between said first riser and said first suspension line and having a cavity contained therein;

said confluence section having a first slit for communicating with said cavity;

a second cord having an exterior surface and passing through said first slit into said cavity, such that an enclosed section of the second cord lies within said cavity, the second cord including a second riser;

said first cord including means for constricting said cavity when a tensile force is applied to said first cord so that said enclosed section is held in said cavity when the tensile force is applied to said first cord and said second cord;

said first riser and said first suspension line remaining outside of the exterior surface of the second cord; and said first and second risers each having an end distal from the confluence section which is adapted to be attached to an article to be decelerated by said parachute.

2. A parachute as recited in claim 1, and further comprising a plurality of risers and a plurality of suspension lines, wherein there are at least as many risers as there are suspension lines.

3. A parachute as recited in claim 2, wherein the ratio of the number of risers to the number of suspension lines is within the range of 1 to 2.

4. A parachute as recited in claim 1, wherein said enclosed section is initially tacked to said confluence section for holding said enclosed section in said cavity until said constricting means constricts the cavity in response to the tensile force.

5. A parachute as recited in claim 1, wherein said confluence section is fabricated of braided material, said braided material comprising said constricting means.

6. A parachute as recited in claim 1, wherein said second cord terminates within said confluence section.

7. A parachute as recited in claim 6, and further comprising a plurality of risers and a plurality of suspension lines, wherein the ratio of the number of risers to the number of suspension lines is two.

8. A parachute as recited in claim 1, said confluence section further including a second slit located between the first slit and the first suspension line, wherein one end of said second cord exits from said second slit and the portion of the second cord which exits from the second slit comprises a second suspension line.

9. A parachute as recited in claim 8, wherein there are an equal number of risers and suspension lines.

* * * * *